US009852541B2

(12) United States Patent
Bitterli et al.

(10) Patent No.: US 9,852,541 B2
(45) Date of Patent: Dec. 26, 2017

(54) INDOOR SCENE ILLUMINATION

(71) Applicant: Disney Enterprises, Inc., Burbank, CA (US)

(72) Inventors: Benedikt Bitterli, Mohlin (CH); Wojciech Jarosz, Zürich (CH); Jan Novak, Zürich (CH)

(73) Assignee: Disney Enterprises, Inc., Burbank, CA (US)

( * ) Notice: Subject to any disclaimer, the term of this patent is extended or adjusted under 35 U.S.C. 154(b) by 159 days.

(21) Appl. No.: 14/749,447

(22) Filed: Jun. 24, 2015

(65) Prior Publication Data
US 2016/0314614 A1 Oct. 27, 2016

Related U.S. Application Data

(60) Provisional application No. 62/151,704, filed on Apr. 23, 2015.

(51) Int. Cl.
G06T 15/55 (2011.01)
G06T 15/80 (2011.01)
G06T 15/50 (2011.01)
G06T 15/06 (2011.01)

(52) U.S. Cl.
CPC ............ G06T 15/506 (2013.01); G06T 15/55 (2013.01); G06T 15/80 (2013.01); G06T 15/06 (2013.01); *G06T 2200/04* (2013.01); *G06T 2215/12* (2013.01)

(58) Field of Classification Search
CPC ................. G06T 15/00–15/87; G06T 2215/12
See application file for complete search history.

(56) References Cited

PUBLICATIONS

Bashford-Rogers, Thomas, Kurt Debattista, and Alan Chalmers. "Importance driven environment map sampling." IEEE transactions on visualization and computer graphics 20.6 (2014): 907-918.*
Clarberg, Petrik, and Tomas Akenine-Möller. "Exploiting visibility correlation in direct illumination." Computer Graphics Forum. vol. 27. No. 4. Blackwell Publishing Ltd, 2008.*
Agarwal et al., "Structured Importance Sampling of Environment Maps," ACM Trans. Graph. (Proc. SIGGRAPH) 22, 3 (Jul. 2003), pp. 605-612.
Arvo, James, "Stratied Sampling of Spherical Triangles," Annual Conference Series (Proc. SIGGRAPH) (1995), pp. 437-438.
Burke et al., "Bidirectional Importance Sampling tor Direct Ilurnination," Rendering Techniques (Proc. EG Symposium on Rendering) (2005), pp. 147-156.

(Continued)

*Primary Examiner* — Daniel Hajnik
(74) *Attorney, Agent, or Firm* — Patterson + Sheridan, LLP

(57) ABSTRACT

Techniques for illuminating an indoor scene. A directional distribution associated with the indoor scene is received. The indoor scene has a first scene element and a first quadrilateral. The first scene element has a first shading point disposed thereon. The directional distribution is reparametrized such that the first quadrilateral as viewed from the first shading point corresponds to an axis-aligned rectangular region in the reparametrized directional distribution. The scene element is illuminated using one or more samples drawn from the shading point by performing importance sampling based on the reparametrized directional distribution.

20 Claims, 10 Drawing Sheets
(4 of 10 Drawing Sheet(s) Filed in Color)

(56) References Cited

PUBLICATIONS

Blinn et al., "Texture and reflection in computer generated images," Commun. ACM 19, 10 (Oct. 1976), pp. 542-547.

Clarberg et al., "Practical Product Importance Sampling for Direct Illumination," Comp. Graph. Forum (Proc. Eurographics) 27, 2 (2008), pp. 681-690.

Cline et al., "Two Stage Importance Sampling for Direct Lighting," Rendering Techniques (Proc. EG Symposium on Rendering) (2006), pp. 103-113.

Clarberg et al., "Wavelet importance sampling: Efficiently evaluating products of complex functions," ACM Trans. Graph (Proc. SIGGRAPH) 24, 3 (Aug. 2005), pp. 1166-1175.

Crow, Franklin C., "Summed-Area Tables for Texture Mapping," Computer Graphics (Proc. SIGGRAPH) (1984), pp. 207-212.

Debevec, Paul, "Rendering synthetic objects into real scenes: Bridging traditional and image-based graphics with global illumination and high dynamic range photography," Annual Conference Series (Proc. SIGGRAPH) (1998), pp. 189-198.

Georgiev et al., "Importance caching for complex illumination," Comp Graph. Forum (Proc. Eurographics) 31, 2 (2012), pp. 701-710.

Greene, N., "Environment mapping and other applications of world projections," IEEE Comput. Graph. Appl. 6, 11 (Nov. 1986), pp. 21-29.

Heitz et al., "Importance Sampling Microfacet-Based BSDFs using the Distribution of Visible Normals," Computer Graphics Forum, vol. 33, Issue 4, Jul. 2014, pp. 103-112.

Jarosz et al., "Importance Sampling Spherical Harmonics," Comp. Graph. Forum (Proc. Eurographics) 28, 2 (Apr. 2009), pp. 577-586.

Jensen, Henrik Wann, "importance Driven Path Tracing using the Photon Map," Rendering Techniques (Proc. EGWorkshop on Rendering) 1995, pp. 326-335.

Kollig et al., "Efficient Illumination by High Dynamic Range Images," Rendering Techniques (Proc. EG Symposium on Rendering) (2003). pp. 45-50.

Ostromoukhov et al., "Fast Hierarchical Importance Sampling with Blue Noise Properties," ACM Trans. Graph. (Proc. SIGGRAPH) 23, 3 (2004), pp. 488-495.

Pharr et al., "Physically Based Rendering, Second Edition: From Theory to Implementation," 2nd ed. pp. 671-674, Morgan Kaufmann Publishers Inc., San Francisco, CA, USA, 2010.

Rousselle et al., "Efficient product sampling using hierarchical thresholding," The Visual Computer (Proc. CGI) 24, 7-9 (2008), pp. 465-474.

Subr et al., "Steerable importance sampling," IEEE Symposium on Interactive Ray Tracing (2007), IEEE Computer Society, pp. 133-140.

Urena et al., "An Area-Preserving Parametrization for Spherical Rectangles," Comp. Graph. Forum (Proc. EG Symposium on Rendering) 32, 4 (2013), pp. 59-66.

Veach, Eric, "Robust Monte Carlo Methods for Light Transport Simulation," PhD thesis, Stanford, CA, USA, 1998.

Vorba et al., "On-line Learning of Parametric Mixture Models for Light Transport Simulation," ACM Trans. Graph. (Proc. SIGGRAPH) 33, 4 (Aug. 2014), 11 pages.

* cited by examiner

INDOOR SCENE ILLUMINATION

CROSS-REFERENCE TO RELATED APPLICATIONS

This application claims benefit of U.S. provisional patent application Ser. No. 62/151,704, filed on Apr. 23, 2015, and which is herein incorporated by reference in its entirety.

BACKGROUND

Computer graphics are used in a variety of formats and may include almost everything on a computing device that is not text or sound. From graphical interfaces to video games and movies, computer graphics provide a computer-rendered visual representation of an object or scene to a viewer or user. Computer graphics may come in the form of a single object or a collection of objects set against a computer-rendered background to create a computer graphic scene. The objects and background of a computer-rendered scene may also include several techniques to provide the scene with a more realistic or pleasing look.

The goal of many computer graphic designers is to provide a computer-rendered graphic or scene that is aesthetically pleasing to a viewer. To provide the more realistic or pleasing look to a computer graphic scene, several rendering and lighting techniques have been developed. These techniques may include 3D projection, ray tracing, shading and texture mapping. Such techniques perform mathematical calculations on the computer graphics to adjust the color and intensity of the pixels of the graphic or scene to give the sense of lighting and detail to the rendered objects. The artificial lighting and rendering of the objects and background of a scene may provide a more realistic or enjoyable look to the computer-rendered objects.

SUMMARY

Embodiments presented in this disclosure provide a computer-implemented method and non-transitory computer-readable medium to perform an operation to illuminate an indoor scene. The operation includes receiving a directional distribution associated with the indoor scene. The indoor scene has a first scene element and a first quadrilateral. The first scene element has a first shading point disposed thereon. The operation also includes reparametrizing the directional distribution such that the first quadrilateral as viewed from the first shading point corresponds to an axis-aligned rectangular region in the reparametrized directional distribution. The operation also includes illuminating the scene element using one or more samples drawn from the shading point by performing importance sampling based on the reparametrized directional distribution.

Embodiments further provide a computer-implemented method to perform an operation to illuminate an indoor scene using image-based lighting. The operation includes receiving an environment map depicting a surrounding environment external to the indoor scene. The indoor has a first scene element and a first opening to the surrounding environment. The first scene element has a first shading point disposed thereon. The operation also includes defining a first portal through which a first region of the surrounding environment is visible to the first shading point. The first portal is a rectangular approximation of the first opening. The operation also includes reparametrizing the environment map such that the first region of the surrounding environment as viewed from the first shading point through the first portal corresponds to an axis-aligned rectangular region in the reparametrized environment map. The operation also includes determining a function of both the reparametrized environment map and a visibility map specifying visibility of the surrounding environment as viewed from the first shading point through the first portal. The operation also includes illuminating the scene element using one or more samples drawn from the shading point through the first portal by importance sampling the function of the reparametrized environment map and the visibility map.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited features presented in this disclosure can be understood in detail, a more particular description of the features, briefly summarized above, may be had by reference to embodiments, some of which are illustrated in the appended drawings.

It is to be noted, however, that the appended drawings illustrate only typical embodiments presented in this disclosure and are therefore not to be considered limiting of its scope, for aspects presented in this disclosure may admit to other equally effective embodiments.

Figure 1:
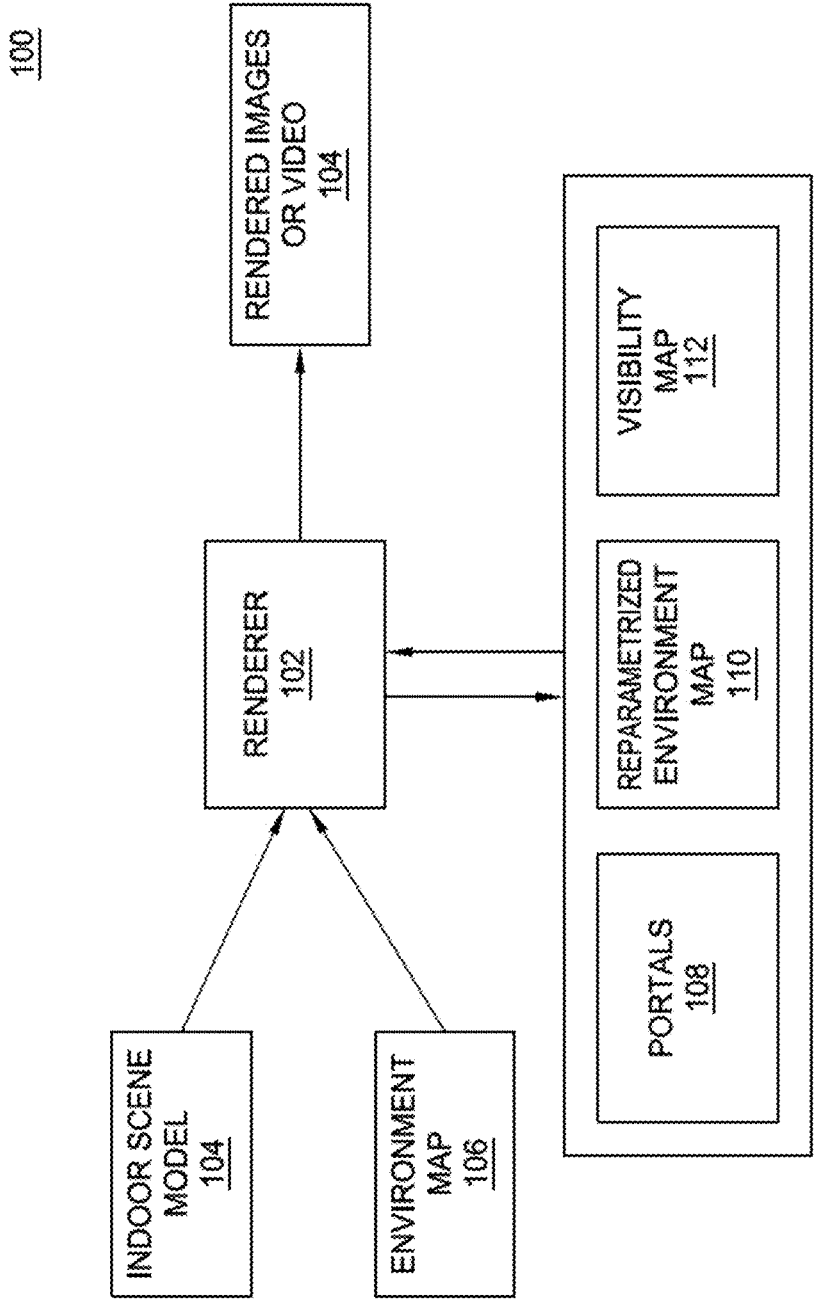

FIG. 1 is a block diagram illustrating a system for indoor scene illumination, according to one embodiment presented in this disclosure.

Figure 2:
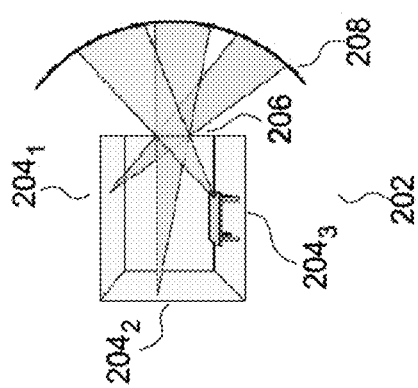
Figure 2:
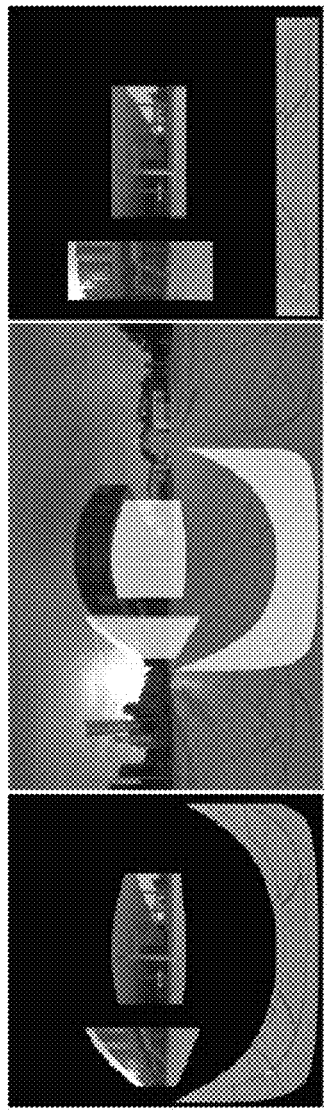

FIG. 2 depicts an indoor scene and associated environment maps showing visible regions from the indoor scene, according to one embodiment presented in this disclosure.

Figure 3:
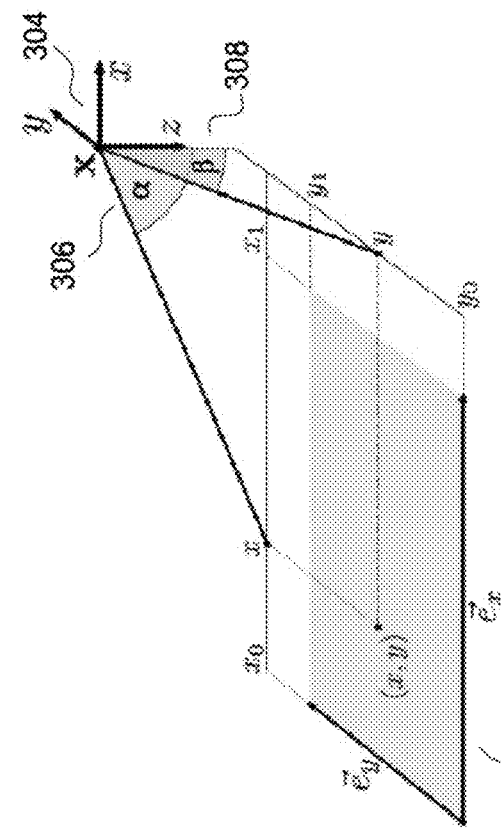

FIG. 3 illustrates a portal in a canonical reference frame centered on a shading point in the indoor scene, according to one embodiment presented in this disclosure.

Figure 4:
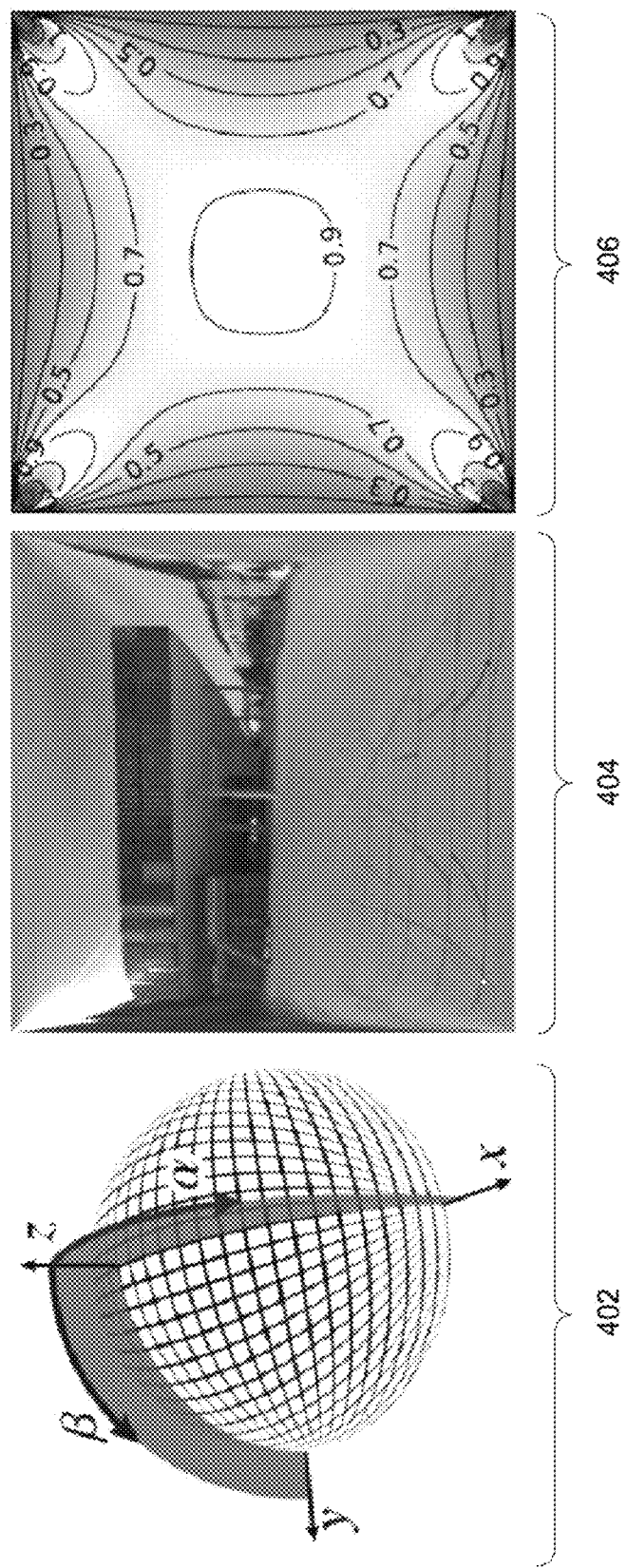

FIG. 4 depicts rectified coordinates over a hemisphere of directions, an environment map resampled using the rectified coordinates, and a contour plot of a resulting determinant, according to one embodiment presented in this disclosure.

Figure 5:
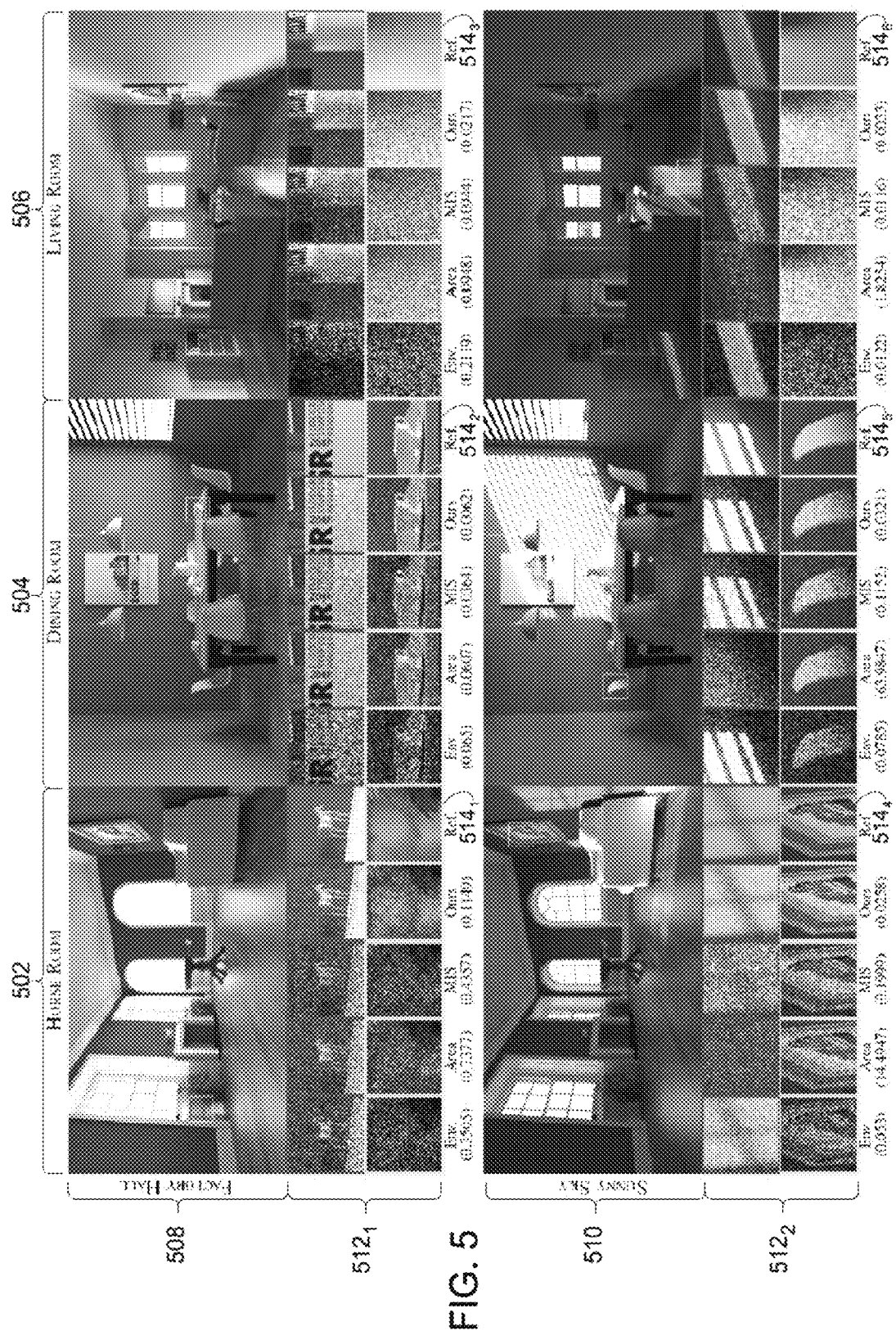

FIG. 5 shows sample images generated for different indoor scene models using different environment maps and based on different rendering approaches, according to one embodiment presented in this disclosure.

Figure 6:
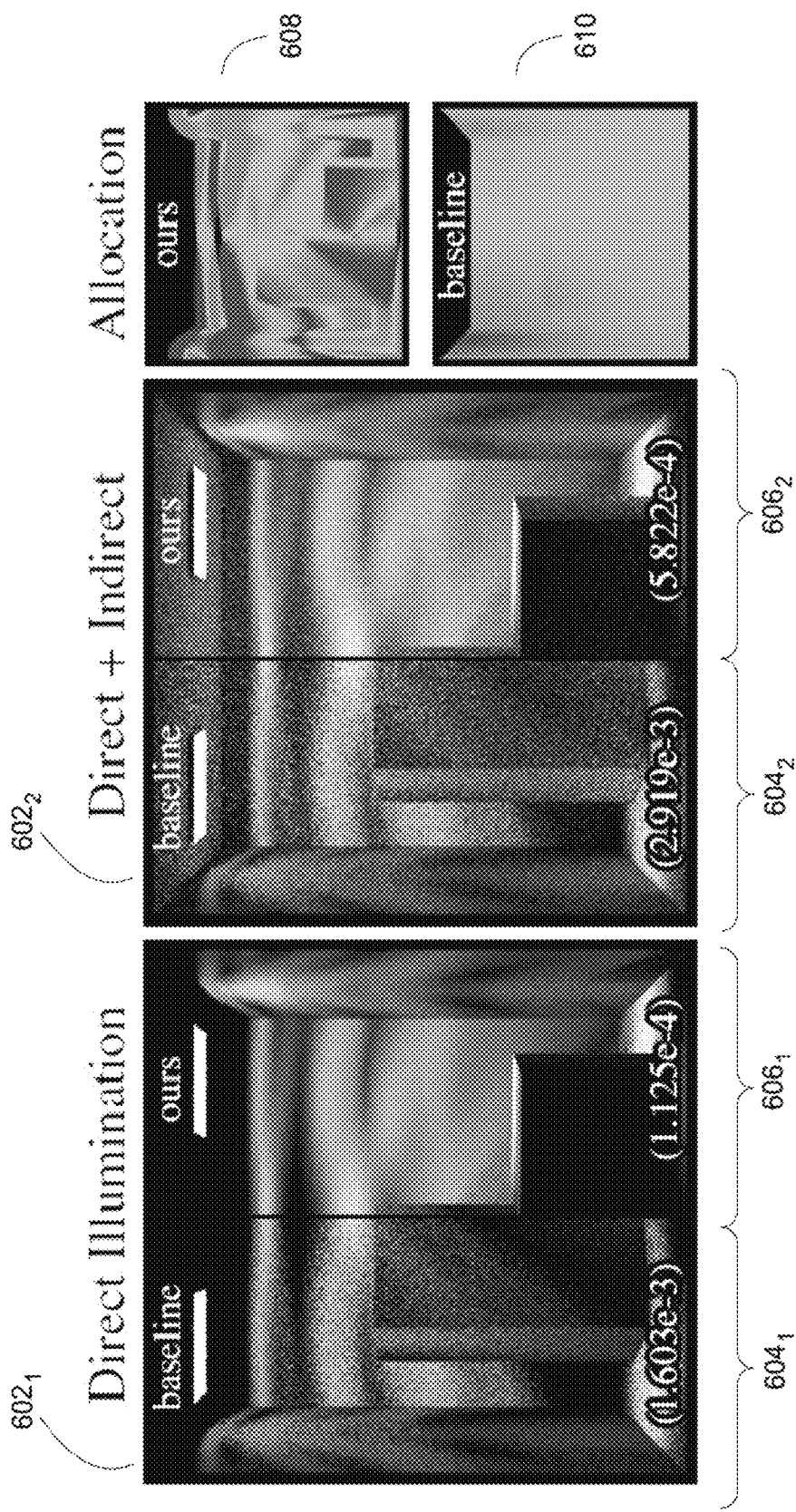

FIG. 6 shows sample images of an indoor scene having two light sources with radially symmetric directional distributions, according to one embodiment presented in this disclosure.

Figure 7:
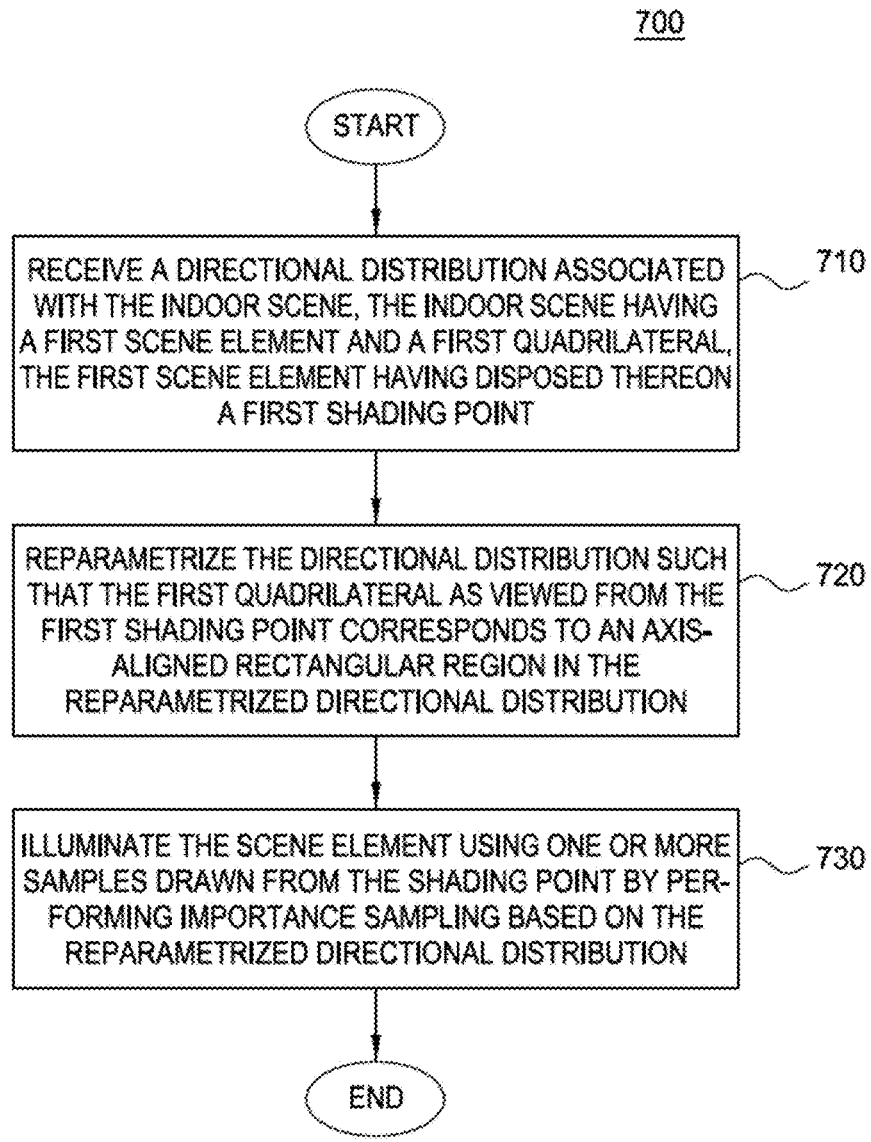

FIG. 7 is a flowchart depicting a method 700 of illuminating an indoor scene, according to one embodiment presented in this disclosure.

Figure 8:
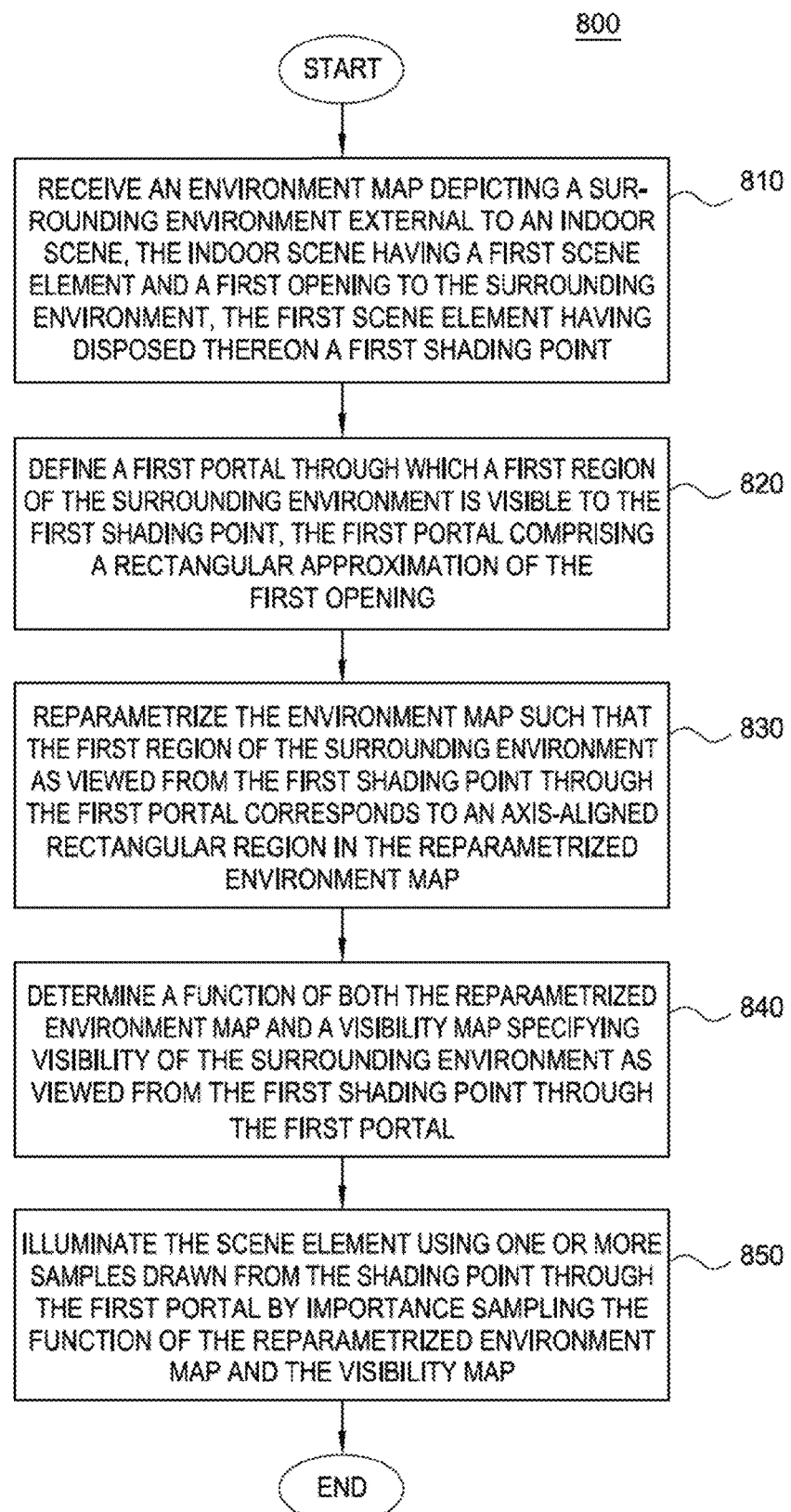

FIG. 8 is a flowchart depicting a method of illuminating an indoor scene using image-based lighting, according to one embodiment presented in this disclosure.

Figure 9:
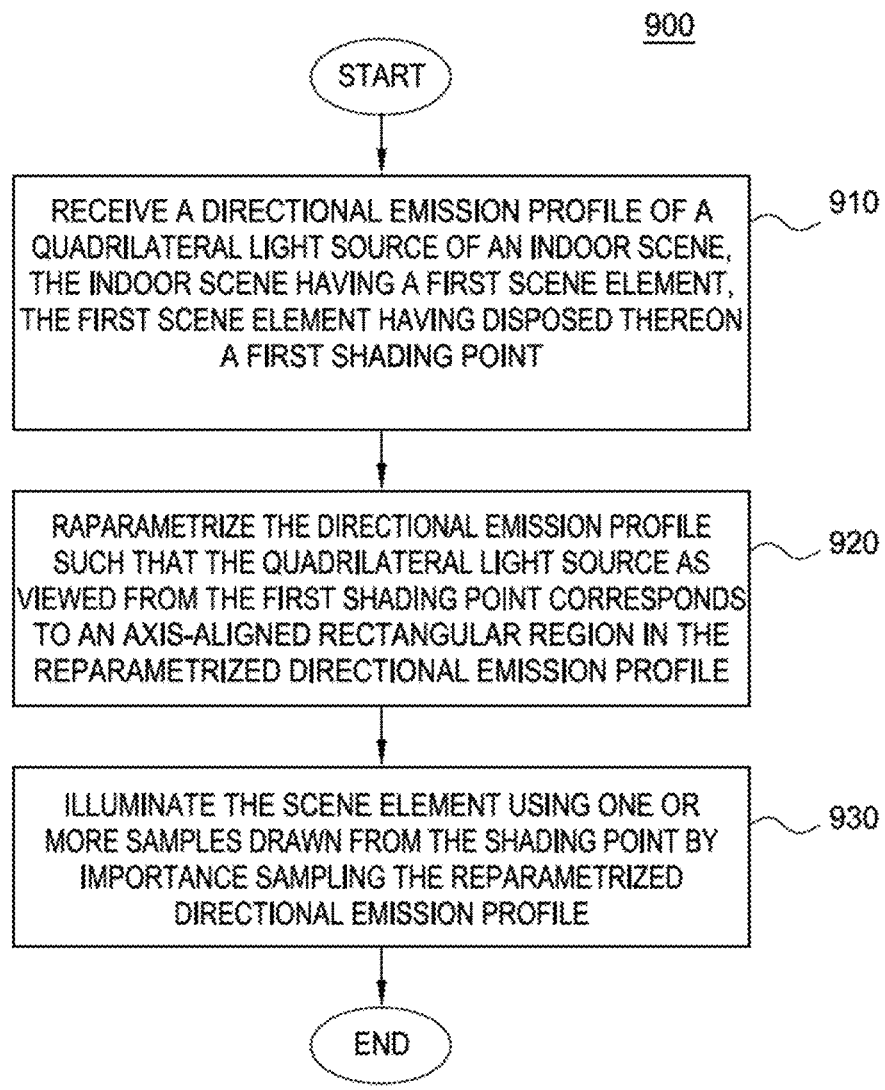
Figure 10:
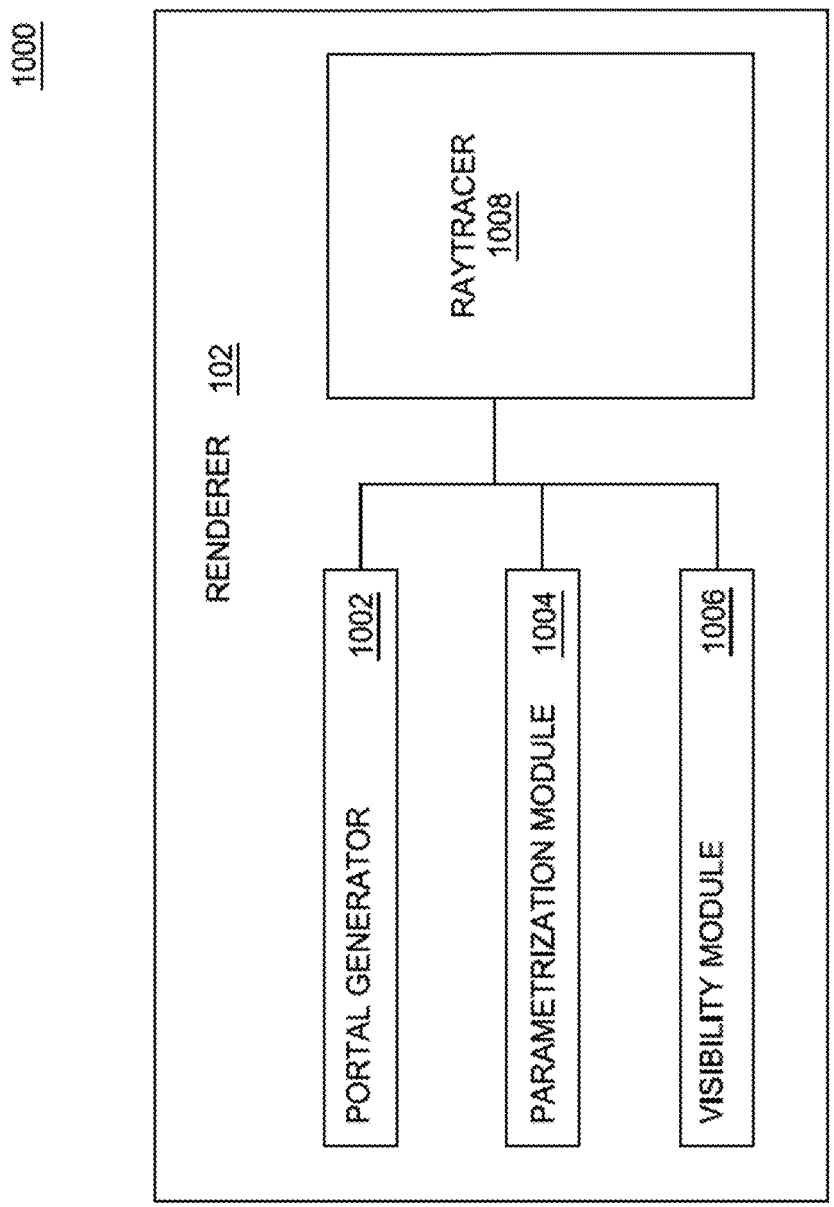

FIG. 9 is a flowchart depicting a method of illuminating an indoor scene having a quadrilateral light source, according to one embodiment presented in this disclosure FIG. 10 is a block diagram illustrating components of a renderer, according to one embodiment presented in this disclosure.

Figure 11:
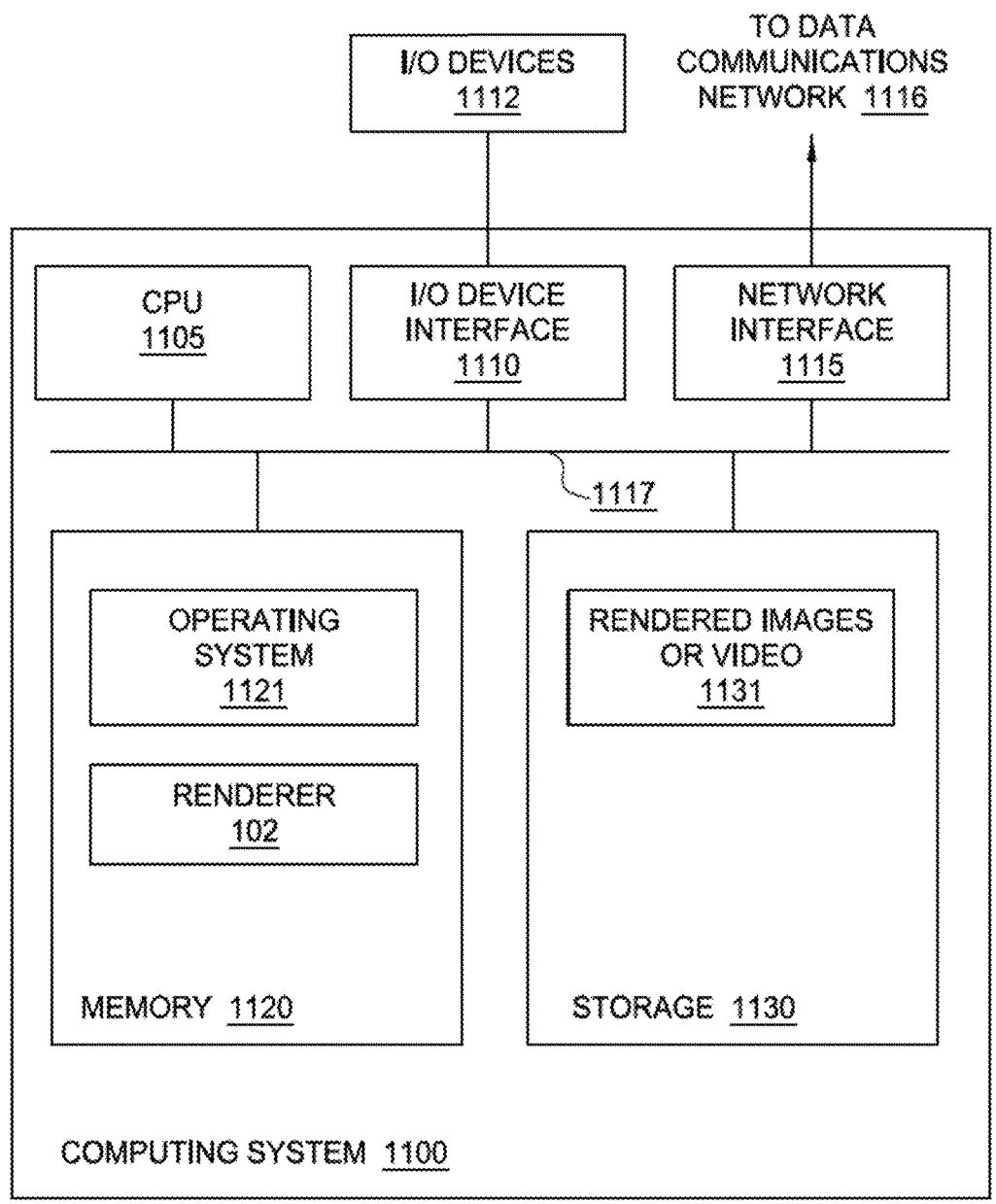

FIG. 11 illustrates a computing system to illuminate an indoor scene, according to one embodiment presented in this disclosure.

DETAILED DESCRIPTION

Embodiments presented in this disclosure provide techniques for indoor scene illumination. Referring to FIG. 1, a block diagram representing a system 100 for indoor scene illumination according to one embodiment is shown. The system 100 includes a renderer 102. In a particular embodiment, the renderer 102 is configured to generate rendered images or video 114 based on an indoor scene model 104 and an environment map 106. To that end, the renderer 102 may define portals 108 and generate a visibility map 112 and a reparametrized environment map 110. In one embodiment, each portal 108 is a rectangular approximation of a respective opening in the indoor scene model 104. At least in some embodiments, the opening may be non-rectangular. The reparametrized environment map 110 is such that any visible region from any shade point in the indoor scene model 104 maps to an axis-aligned rectangular region in the reparametrized environment map 110. The mapping is provided by the visibility map 112, which is generated from the indoor scene model 104.

Accordingly, embodiments presented in this disclosure provide techniques to efficiently importance sample distant, all-frequency illumination in indoor scenes. In such cases, merely performing environment sampling may be inefficient because distant lighting is typically only visible through comparatively small openings, such as windows. This aspect of visibility may be addressed by defining a portal around each window to direct samples towards the openings. Uniformly sampling the portal (its area or solid angle), however, disregards the possibly of a high frequency environment map.

Embodiments presented in this disclosure thus provide a new portal importance sampling technique that takes into account both the environment map and its visibility through the portal, drawing samples proportional to a product of the two. One embodiment includes using a portal-rectified reparametrization of the environment map with a property that the visible region induced by a rectangular portal projects to an axis-aligned rectangle in the reparametrized environment map. Doing so allows sampling to occur according to a desired product distribution at an arbitrary shading location using a single, precomputed summed-area table. Such an approach is generally introduces less variance relative to other renderers. Further, the approach may also be applied to quadrilateral light sources with directional emission profiles, thereby permitting efficient rendering of profiles with soft shadows. Quadrilateral light sources may also be referred to herein as quad light sources.

Captured, image-based representations of illumination can be an effective technique to incorporate realistic lighting in virtual scenes. Environment mapping, or reflection mapping, is an efficient image-based lighting technique for approximating the appearance of a reflective surface by means of a pre-computed texture image. Environment mapping may also be extended to imagery having a high dynamic range. Environment lighting can thus be a useful tool in architectural visualization and film production for expressing rich, real-world illumination which may otherwise be difficult to represent synthetically.

In the context of the present disclosure, at least some embodiments compute a radiance $L_r$ reflected from a shading point x in direction $\omega\vec{\omega}_o$:

$$L_r(x, \vec{\omega}_o) = \int_{\Omega^+} \rho(x, \vec{\omega}_o, \vec{\omega}_i) L_{env}(\vec{\omega}_i) V(x, \vec{\omega}_i) d\vec{\omega}_i^\perp, \quad \text{(Equation 1)}$$

where $\rho$ is a bidirectional reflectance distribution function, $L_{env}$ is distant lighting defined by an environment map, V is visibility to the environment, and $d\vec{\omega}^\perp$ represents a projected solid angle measure over a hemispherical domain $\Omega^+$. At least some embodiments determine an efficient Monte Carlo approximation of this integral. Some example approaches to importance sampling include sampling just the environment map, just the bidirectional reflectance distribution function, or some linear combination using multiple importance sampling.

At least some embodiments involve rendering indoor scenes, which are typically characterized by closed-off rooms connected to an external environment only through a set of visibility openings, e.g., windows or doorways. Most of the environment is therefore occluded, and many of the example approaches become ineffective. This is because the example approaches importance sample only the environment map and/or the bidirectional reflectance distribution function while disregarding visibility. Product sampling techniques may possibly be extended to account for visibility, such as by precomputing it or rasterizing it to a suitable form on-the-fly. Further, rendering algorithms may be modified to factor in visibility. However, because visibility is typically unknown for general indoor scenes, such product sampling techniques and rendering algorithms are costly in terms of memory usage, computation time, or use of complex data structures.

To improve sampling efficiency at least in such contexts, sample guides, referred to as portals, may be defined over windows and doorways to mark connections to the external environment. Samples are then directed towards the portals and may hit the environment map. Although the sizes and/or shapes of portals may vary to suit the needs of a particular case, rectangular portals can present a balance between sampling efficiency and accuracy in approximating shapes of conventional, architectural openings.

FIG. 2 depicts an indoor scene 202 and associated environment maps 210, 212, 214 showing visible regions from the indoor scene 202, according to one embodiment presented in this disclosure. As shown, the indoor scene 100 includes shading points $204_{1-3}$ an opening 206 to an external environment represented by an environment map 208. Shading points may also be referred to herein as shade points. A portal may be defined as a rectangular approximation of the opening 206. The environment map 210, showing visible regions from the shading points $2014_{1-3}$, is given by a product of the distant lighting and the environment visibility $(L_{env}(\vec{\omega}) \times V(\vec{\omega}))$. The environment map 210 is parametrized using global spherical coordinates and yields warped visible regions, which are computationally costly to sample. That is, although the portal is rectangular in shape, the visible regions are warped due to projection of the environment map, yielding a different location and shape for each shading point.

One computationally practical, albeit imperfect, way to account for visibility is to use multiple importance sampling to additionally importance sample an area or solid angle of the portal. However, performing multiple importance sampling between portal and environment map sampling yields a probably density function that is just a linear combination of the individual, importance-sampled terms of distant lighting and environment visibility, as shown in the environment map 212. The linear combination may be given by $\alpha L_{env}(\vec{\omega}) + bV(\vec{\omega})$. This can greatly differ from a desired product such as shown in environment map 210 and may be wasteful in terms of sampling effort at least in some cases. In contrast, using a portal-rectified reparametrization of the environment map according to the techniques disclosed herein results in a reparametrized environment map 214 having rectangular, visible regions that are efficient to sample. The reparametrized environment map 214 showing visible regions is given by a product of the distant lighting and the environment visibility ($L_{env}(\vec{\omega}) \times V(\vec{\omega})$).

Accordingly, at least some embodiments disclosed herein importance sample a product of the portal visibility and environment map, effectively drawing samples at each shade point proportional to visible regions of the environment map. To overcome the challenges described above, it is noted that the shapes of the visible regions depend on the parametrization of the environment map. Environment maps 210 and 212, for example, use spherical coordinates. Based on this observation, a portal-rectified reparametrization of the environment map may be generated with a property that the visible region from any shade point always maps to an axis-aligned rectangular region in the reparametrized environment map. This rectified projection permits developing a practical algorithm to importance sample visible regions of the environment map while requiring just a single, precomputed, summed-area table per portal. The resulting sampling algorithm is inexpensive and introduces little or no variance. Doing so also permits evaluating a total energy of the environment map visible through the portal. For scenes with multiple portals, doing so permits probabilistically or deterministically selecting which portal to sample, based on the expected visible contribution of the portal. This portal sampling technique can be incorporated into a raytracer or path tracer to considerably reduce noise compared to alternative approaches. The sampling technique can also be applied to the domain of sampling a quadrilateral light source having a directional emission profile.

FIG. 3 illustrates a portal 302 in a canonical reference frame centered on a shading point 304 in the indoor scene, according to one embodiment presented in this disclosure. In one embodiment, the environment map is reparametrized based on rectified coordinates subtended with the coordinate axes, such that each portal always projects onto the environment map as an axis-aligned rectangle. Once the environment map is resampled using rectified coordinates, the rectangular visible region may be importance sampled more efficiently relative to alternative approaches. To simplify the derivation, all points and directions can be expressed in a canonical reference frame. At least in some embodiments, the canonical reference frame is a canonical coordinate frame centered on the shading point 304 and rotated to align the x and y axes with horizontal edge $\vec{e}_x$ and vertical edge $\vec{e}_y$ of the portal 302. At least in some embodiments, these transformations are merely to simplify notation and do not alter visible regions in any manner.

In some embodiments, because the edges of the portal are aligned with the coordinate axes, axis-aligned rectangular visible regions may be trivially enforced by parametrizing the environment map using the x and y axes. But because the axes extend to infinity, it may be impractical to thereafter resample the environment map. This aspect may be addressed by expressing the horizontal and vertical positions using predefined angles α 306 and β 308, which in one embodiment are given by:

$$(\alpha, \beta) = \phi(x, y) = (\arctan(x), \arctan(y)).$$ (Equation 2)

The inverse mapping:

$$(x, y) = \phi^{-1}(\alpha, \beta) = (\tan(\alpha), \tan(\beta)),$$ (Equation 3)

yields back the spatial coordinates, which can be transformed into a direction $\vec{\omega}$:

$$\vec{\omega} = \frac{(x, y, 1)}{d}, d = \sqrt{x^2 + y^2 + 1}.$$ (Equation 4)

In some embodiments, the direction $\vec{\omega}$ is then used to evaluate the environment map for a given coordinate frame and angles (α, β). Although the canonical reference frame is defined by a shade point as well as portal position and portal orientation, the direction $\vec{\omega}$ only depends on the portal axes $\vec{e}_x, \vec{e}_y$ and the rectified coordinates (α, β). Consequently, in some embodiments, the environment map only needs to be resampled once for each unique portal orientation, rather than once for each possible combination of portal and shade point, thus greatly increasing sampling efficiency at least in some cases.

FIG. 4 depicts rectified coordinates (α, β) over a hemisphere 402 of directions, an environment map 404 resampled using the rectified coordinates, and a contour plot 406 of a resulting determinant, according to one embodiment presented in this disclosure. Although generating samples in rectified coordinates may be more computationally efficient compared to alternative approaches, integration is typically performed with respect to a solid angle measure. Accordingly, in order to correctly transform probability densities with respect to one measure to the other, some embodiments compute a Jacobian determinant of the mapping between the two spaces. The Jacobian determinant may be derived in two steps. First, the determinant is computed with respect to the area measure on the canonical portal plane. Second, the determinant is derived with respect to the solid angle.

In one embodiment, the Cartesian x and y coordinates serve as a surface area parametrization of the canonical portal plane. The relation to rectified coordinates can be expressed as:

$$\frac{dxdy}{d\alpha d\beta} = \begin{vmatrix} \frac{\partial \phi_x^{-1}}{\partial \alpha} & \frac{\partial \phi_x^{-1}}{\partial \beta} \\ \frac{\partial \phi_y^{-1}}{\partial \alpha} & \frac{\partial \phi_y^{-1}}{\partial \beta} \end{vmatrix} = \begin{vmatrix} \sec^2(\alpha) & 0 \\ 0 & \sec^2(\beta) \end{vmatrix} = \sec^2(\alpha)\sec^2(\beta).$$ (Equation 5)

The relation with respect to the solid angle involves multiplying by a geometry term:

$$\frac{d\vec{\omega}}{d\alpha d\beta} = \frac{d\vec{\omega}}{dxdy} \frac{dxdy}{d\alpha d\beta} = \frac{\vec{\omega}_z}{d^2} \sec^2(\alpha)\sec^2(\beta),$$ (Equation 6)

which can be further simplified using the trigonometric identity $\sec^2(\alpha) = 1 + \tan^2(\alpha) = 1 + x^2$ and the definition of $\vec{\omega}$ to obtain:

$$\frac{d\vec{\omega}}{d\alpha d\beta} = \frac{1}{d^3}(1 + x^2)(1 + y^2)$$ (Equation 7)

$$= \frac{d^4}{d^3} \left( \frac{1}{d^2} + \frac{x^2}{d^2} \right) \left( \frac{1}{d^2} + \frac{y^2}{d^2} \right)$$ (Equation 8)

$$= d(\vec{\omega}_z^2 + \vec{\omega}_x^2)(\vec{\omega}_z^2 + \vec{\omega}_y^2)$$ (Equation 9)

-continued $$= \frac{(1-\vec{\omega}_y^2)(1-\vec{\omega}_x^2)}{\vec{\omega}_z}.$$  (Equation 10)

This relation only depends on the sampled direction $\vec{\omega}$ and can readily be computed during sampling. The contour plot 406 of FIG. 4 is a contour plot of this Jacobian determinant of Equation 10.

In some embodiments, rectified coordinates serve as an effective sampling domain because in contrast to spherical coordinates, the rectified coordinates preserve axis-aligned straight lines. Further, the joint distribution $\rho(\alpha, \beta) \propto L_{env}(\vec{\omega})$ can be decomposed into a product of marginal and conditional distributions, precomputed once for all shading points. To construct these distributions, embodiments resample the luminance of $L_{env}$ using the rectified coordinates and into an importance map. In some embodiments, the importance map is a scalar importance table I. Embodiments additionally scale the luminance by the Jacobian determinant from Equation 10 in order to account for non-uniform stretching of the importance map due to the rectification. Because the canonical frame, and thus ϕ, is different for each portal orientation, a separate importance map is associated with each portal. Further, as long as the portal is only viewed from a single side, it is sufficient to store only the upper hemisphere of the importance map.

At least some embodiments importance sample visible regions of the environment map in rectified coordinates. Given a shading point and a portal, the visible region of the importance map is computed using:

$$(\alpha_0,\beta_0)=\phi(x_0,y_0), \text{ and } (\alpha_1,\beta_1)=\phi(x_1,y_1) \quad \text{(Equation 11)}$$

where $(x_0, y_0)$ and $(x_1, y_1)$ are the canonical coordinates of the bottom left and top right corners of the portal, respectively, such as shown in FIG. 3. The goal is choose a sample point $(\alpha, \beta)$ inside the visible region with probability $\rho(\alpha, \beta) \propto I(\alpha, \beta)$.

Further, embodiments draw samples by importance sampling discrete 2D distributions, treating the values in the visible region of I as an unnormalized, piecewise constant probability density function. Embodiments also derive a marginalized density $\rho_\alpha(\alpha)$ and a conditional density $\rho_\beta(\beta|\alpha)$ from the probability density function. The difference between this technique and alternative approaches of sampling discrete distributions is that in the former, only a rectangular subset of $\rho(\alpha, \beta)$ is used. This subset varies depending on the location of the shading point, meaning that the marginalized probability density function is different for each x. In addition, because the extents of the visible region do not generally fall on integer coordinates in the discrete table, the fractional table cells need to be properly considered.

To address these aspects, embodiments transform the discrete table into a summed area table, which permits evaluating integrals over rectangular windows in constant time. Linearly interpolating the summed area table also permits computing integrals of fractional rectangles. The summed area table version of I as referred to herein as $S(\alpha, \beta)$ as is given by:

$$S(\alpha,\beta)=\int_0^\alpha \int_0^\beta I(\tilde\alpha,\tilde\beta)d\tilde\beta d\tilde\alpha. \quad \text{(Equation 12)}$$

A shorthand form $R(a_0, b_0, a_1, b_1)$ may additionally be defined in some embodiments. The shorthand form evaluates the integral of values inside a rectangle $[a_0, a_1] \times [b_0, b_1]$ and is given by:

$$R(a_0,b_0,a_1,b_1)=S(a_0,b_0)+S(a_1,b_1)-S(a_1,b_0)-S(a_0,b_1). \quad \text{(Equation 13)}$$

In one embodiment, given the visible region $[\alpha_0, \alpha_1] \times [\beta_0, \beta_1]$ induced by the shading point x, the marginal cumulative distribution function may be defined as:

$$P_\alpha(\alpha) = \frac{R(\alpha_0, \beta_0, \alpha, \beta_1)}{R(\alpha_0, \beta_0, \alpha_1, \beta_1)}, \quad \text{(Equation 14)}$$

and the conditional cumulative distribution function may be defined as:

$$P_\beta(\beta | \alpha) = \frac{R(\lfloor\alpha\rfloor_h, \beta_0, \lceil\alpha\rceil_h, \beta)}{R(\lfloor\alpha\rfloor_h, \beta_0, \lceil\alpha\rceil_h, \beta_1)}, \quad \text{(Equation 15)}$$

where h is the side length of a table cell, and where $\lfloor \cdot \rfloor_h$ and $\lceil \cdot \rceil_h$ round to the closest smaller and larger multiples of h, respectively. For a table with N×N grid cells, the cell side length is π/N.

Given two random variables $\xi_1, \xi_2 \in [0, 1]$, embodiments compute corresponding rectified coordinates $(\alpha, \beta)$ based on $(P_\alpha^{-1}(\xi_1), P_\beta^{-1}(\xi_2|\alpha))$. Both the marginal cumulative distribution function and the conditional cumulative distribution function are piecewise linear and can be exactly inverted. In some embodiments, P may be inverted according to the following pseudocode:

---
Algorithm 1: $P_\alpha^{-1}(\xi)$ 1  lowerBound ← $\lfloor \alpha_0 \rfloor_h$;
2  upperBound ← $\lceil \alpha_1 \rceil_h$;
3  while upperBound − lowerBound ≠ h do
4  |  midPoint ← $\lfloor \frac{1}{2}(\text{lowerBound}+\text{upperBound}) \rfloor_h$;
5  |  if $P_\alpha(\text{midPoint}) > \xi$ then
6  |  |  upperBound ← midPoint;
7  |  else
8  |  |_  lowerBound ← midPoint;
9  return lowerBound + h $\frac{\xi - P_\alpha(\text{lowerBound})}{P_\alpha(\text{upperBound}) - P_\alpha(\text{lowerBound})}$
---

The inversion procedure of Algorithm 1 follows a predefined bisection. First, a conservative interval of grid cells is computed that is guaranteed to contain $P_\alpha^{-1}(\xi)$. This interval is then repeatedly shrunk until it is precisely one grid cell wide. The per-grid-cell cumulative distribution function is linear and can be directly inverted. The inversion procedure for $P_\beta$ follows analogously, only using $\beta_0, \beta_1$ and $P_\beta(\cdot|\alpha)$ instead of the α counterparts.

In some embodiments, for purposes of integrating over the hemisphere, the sampling probability density function can be expressed in solid angle measure as:

$$p_{\vec\omega}(\vec\omega) = \left|\frac{d\vec\omega}{d\alpha d\beta}\right|^{-1} p_\alpha(\alpha) p_\beta(\beta|\alpha) = \frac{\vec\omega_z p_\alpha(\alpha) p_\beta(\beta|\alpha)}{(1-\vec\omega_y^2)(1-\vec\omega_x^2)}. \quad \text{(Equation 16)}$$

Because the importance table is pre-multiplied by the Jacobian determinant in Equation 10, its inverse in Equation 16 approximately cancels out (up to a discretization error), thus leading to near-perfect importance sampling of the visible environment map at least in some cases.

In some embodiments, the importance sampling techniques disclosed herein may be implemented in a path tracer as an alternative light sampling strategy for portals and quad lights with directional emission profiles. In a particular embodiment, the directional emission profiles may be illuminating Engineering Society (IES) profiles. Upon loading the indoor scene model, embodiments precompute and store the summed area table S for each portal or quad light. Note that portals with parallel axes can share the same precomputed table, e.g., pairs of windows on the same wall in a given indoor scene. During rendering, embodiments estimate direct illumination using one bidirectional reflectance distribution function sample and one light sample, which are combined using a power heuristic with an exponent of two.

For indoor scenes having multiple portals or quad lights, some embodiments determine an expected contribution of each portal or quad light in order to probabilistically or deterministically select only a subset of them for sampling, based on their expected contribution. One example approach selects portals or quad lights based on a subtended solid angle. At least in some cases, the portal-rectified reparameterization of the environment map may be advantageous in that the summed-area table permits integrating, in constant time, the total energy of the environment map visible through a portal from any shade point. Consequently, a portal or quad light may be probabilistically or deterministically selected proportional to its total energy, and the contribution of the selected portal may be estimated using just one sample, which may be referred to as total visible energy selection.

FIG. 5 shows sample images $512_{1-2}$ generated for three indoor scene models 502, 504, 506 using two different environment maps 508, 510, based on four different rendering approaches and compared with reference images $514_{1-4}$, according to one embodiment presented in this disclosure. The four different rendering approaches include sampling only the environment map, sampling only the area or solid angle of the portal, sampling both via multiple importance sampling, and the indoor scene illumination techniques disclosed herein, such as importance sampling a product of the reparametrized environment map and the visibility using the techniques disclosed herein. Measures of mean-squared error for the different rendering approaches are shown in parentheses. As indicated in FIG. 5, the indoor scene illumination techniques provide the lowest measure of mean-squared error compared to the three alternative approaches, based on the same indoor scene model and environment map.

As described above, embodiments presented herein may be applied not just to importance sampling an environment map visible through a portal but also to importance sampling a quad light with a directional emission profile. Such light sources may be desirable because they permit artistic control of both the directional profile and the softness of the shadows, owing to the finite area of the quad light. The importance sampling techniques disclosed herein may be applied to direct lighting from such quad lights by treating the quad light as a portal while treating the directional emission profile as an environment map. In this regard, sweeping the directional emission profile over the quad light may be considered the same as centering the directional emission profile flipped at the shading location.

FIG. 6 shows sample images $602_{1-2}$ of an indoor scene having two light sources with radially symmetric directional distributions, according to one embodiment presented in this disclosure. The directional distributions are defined with an image having a resolution of 1×64 in spherical coordinates and that is resampled to a resolution of 512×512 in rectified space. Each sample image $602_{1-2}$ provides a comparison between results $604_{1-2}$ from uniform surface area sampling and results $606_{1-2}$ from the importance sampling techniques disclosed herein. In particular, the comparison pertains to an equal sample count for the problem domain of importance sampling quad lights with directional emission profiles.

As indicated by the mean-squared error values shown in parentheses, the techniques disclosed herein produces mean-squared error values that are lower by five- to fourteen-fold. Furthermore, the techniques disclosed herein merely introduce an overhead of twenty to twenty-four percent. As shown, false-color visualizations 608 depicts the allocation of samples to the two light sources using probabilistic selection based on total visible contribution in conjunction with the importance sampling techniques disclosed herein. On the other hand, false-color visualization 610 depicts the allocation of samples to the two light sources using a probabilistic selection based on subtended solid angle in conjunction with uniform surface area sampling.

Embodiments may also probabilistically or deterministically select which quad light to sample, based on the integrated profile visible through each quad light. Doing so may greatly reduce noise in regions where the more distant light—with respect to the shading point—dominates the illumination due to alignment with peaks of the directional distribution. Using the techniques disclosed herein, the mean-squared error of estimating direct illumination has been reduced by a factor of fourteen in some cases. And even when including noisier, global illumination, the mean-squared error has still been improved by a factor of five in some cases.

At least some embodiments disclosed herein provide techniques to importance sample visible regions of a tabulated, directional distribution through a rectangular opening. To improve efficiency, embodiments rely on a rectification of the hemisphere of directions, that always maps the rectangular opening to axis-aligned rectangular regions in the tabulation. The techniques may then be used for various rendering problem domains, such as importance sampling the environment map visible at a shade point through a portal, importance sampling a directional emission distribution seen on a quad light from a shade point, etc. These problem domains may often pose challenges to alternative approaches for importance sampling. Further, besides being more efficient at least in some cases, the techniques disclosed herein can result in considerable variance reduction compared to alternative approaches.

At least in some embodiments, the mappings disclosed herein do not provide for area preservation. The lack of area preservation can be accounted for by pre-multiplying the resampled environment map by the Jacobian, which is shown in FIG. 4. This is approximately canceled out when dividing by the Jacobian in the solid angle measure probability density function during rendering as given by Equation 16. However, some care may be needed to avoid numerical instability in the corners where the Jacobian approaches infinity.

The rectified coordinates disclosed herein differ from alternative parametrization approaches in various ways. In particular, embodiments parametrize the vertical axis with an angle $\beta$, while alternative approaches has a second coordinate that may be interpreted as the vertical height in cylindrical coordinates. At least in some embodiments, the former technique preserves axis-aligned straight lines, while the latter approaches preserve area. The latter approaches may adequately handle ambient environments but may not necessarily be able to cope with a high frequency environment map beyond the portal.

Further, the rectification disclosed herein implicitly samples the product of visibility and lighting by considering only the visible rectangular regions. Some embodiments may map other terms of the reflection equation, such as the bidirectional reflectance distribution function, cosine term, or tinting texture on the portal, to rectified coordinates and process the resulting, axis-aligned, multi-product using techniques such as wavelet importance sampling.

FIG. 7 is a flowchart depicting a method 700 of illuminating an indoor scene, according to one embodiment presented in this disclosure. The method 700 may be performed by the renderer 102 of FIG. 1. As shown, the method 700 begins at step 710, where the renderer 102 receives a directional distribution associated with the indoor scene. The indoor scene has a first scene element and a first quadrilateral. The first scene element has a first shading point disposed thereon. At step 720, the renderer 102 reparametrizes the directional distribution such that the first quadrilateral as viewed from the first shading point corresponds to an axis-aligned rectangular region in the reparametrized directional distribution. At step 730, the renderer 102 illuminates the scene element using one or more samples drawn from the shading point by performing importance sampling based on the reparametrized directional distribution.

FIG. 8 is a flowchart depicting a method 800 of illuminating an indoor scene using image-based lighting, according to one embodiment presented in this disclosure. The method 800 may be performed by the renderer 102 of FIG. 1. As shown, the method 800 begins at step 810, where the renderer 102 receives an environment map depicting a surrounding environment external to the indoor scene. The indoor scene has a first scene element and a first opening to the surrounding environment. Here also, the first scene element has a first shading point disposed thereon. At step 820, the renderer 102 defines a first portal through which a first region of the surrounding environment is visible to the first shading point. At least in some embodiments, the first portal is a rectangular approximation of the first opening, which may be non-rectangular. For instance, the opening may be an oval window.

At step 830, the renderer 102 reparametrizes the environment map such that the first region of the surrounding environment as viewed from the first shading point through the first portal corresponds to an axis-aligned rectangular region in the reparametrized environment map. At step 840, the renderer 102 determines a function of both the reparametrized environment map and a visibility map specifying visibility of the surrounding environment as viewed from the first shading point through the first portal. In a particular embodiment, the function is a product of the reparametrized environment map and the visibility map. At step 850, the renderer 102 illuminates the scene element using one or more samples drawn from the shading point through the first portal by importance sampling the function of the reparametrized environment map and the visibility map.

At least in some embodiments, the environment map is reparametrized in order to permit importance sampling of the function while requiring only a single, summed-area table per portal. The first portal is generated in order to improve sampling efficiency relative to the first opening. The environment map subsequent to reparametrization is parametrized using rectified coordinates comprising α and β angles subtended with x and y axes. The environment map prior to reparametrization is parametrized using spherical coordinates spherical coordinates or Cartesian coordinates.

In some embodiments, the indoor scene has multiple shading points and multiple openings to the surrounding environment, and multiple portals may be generated. In such cases, the environment map is reparametrized such that any region of the surrounding environment as viewed from the any shading point through any portal corresponds to an axis-aligned rectangular region in the environment map. Each portal may be associated with a respective importance map. The renderer 102 may determine, for each portal, a respective, expected contribution of the reparametrized environment map visible through the respective portal. The renderer 102 may also determine to importance sample the first portal based on its expected contribution, where at least one other portal is not importance sampled.

FIG. 9 is a flowchart depicting a method 900 of illuminating an indoor scene having a quadrilateral light source, according to one embodiment presented in this disclosure. The method 900 may be performed by the renderer 102 of FIG. 1. As shown, the method 900 begins at step 910, where the renderer 102 receives a directional emission profile of the quadrilateral light source. The indoor scene has a first scene element, and the first scene element has first shading point disposed thereon. At step 920, the renderer 102 reparametrizes the directional emission profile such that the quadrilateral light source as viewed from the first shading point corresponds to an axis-aligned rectangular region in the reparametrized directional emission profile. At step 930, the renderer 102 illuminates the scene element using one or more samples drawn from the shading point by importance sampling the reparametrized directional emission profile.

FIG. 10 is a block diagram illustrating components 1000 of the renderer 102 of FIG. 1, according to one embodiment presented in this disclosure. As shown, the components 1000 include a portal generator 1002, a parametrization module 1004, a visibility module 1006, an importance sampler 1008, and a raytracer 1010. In one embodiment, each component has respective source code and is uniquely identifiable via a respective, distinct component name. The portal generator 1002 is configured to define portals for the indoor scene model. In some embodiments, the portals are defined at least in part based on user input, such as user input specifying a position, size, shape, and/or other parameters for a desired portal. In alternative embodiments, the portals are defined automatically by analyzing the indoor scene model according to a set of portal definition rules, without requiring user input specifying any portal parameter.

In one embodiment, the parametrization module 1004 is configured to reparametrize the environment map according to the techniques disclosed herein. The visibility module 1006 is configured to generate the visibility map based on the indoor scene model. The raytracer 1008 is configured to importance sample the product of the reparametrized environment map and the visibility map in order to illuminate scene elements in the indoor scene model. The components 1000 and the names thereof may be tailored to suit the needs of a particular case and without departing from the scope of the present disclosure. For example, in some embodiments, the product of the reparametrized environment map and the visibility map may be importance sampled based on a path tracer rather than a raytracer component of the renderer.

FIG. 11 illustrates a computing system 1100 to illuminate an indoor scene, according to one embodiment presented in this disclosure. As shown, the computing system 1100 includes, without limitation, a central processing unit (CPU) 1105, a network interface 1115 connecting the system to a network 1116, an interconnect 1117, a memory 1120, and storage 1130. The computing system 1100 may also include an I/O device interface 1110 connecting I/O devices 1112 (e.g., keyboard, display and mouse devices) to the computing system 1100.

The CPU 1105 retrieves and executes programming instructions stored in the memory 1120. Similarly, the CPU 1105 stores and retrieves application data residing in the memory 1120. The interconnect 1117 facilitates transmission, such as of programming instructions and application data, between the CPU 1105, I/O device interface 1110, storage 1130, network interface 1115, and memory 1120. CPU 1105 is included to be representative of a single CPU, multiple CPUs, a single CPU having multiple processing cores, and the like. And the memory 1120 is generally included to be representative of a random access memory. The storage 1130 may be a disk drive storage device. Although shown as a single unit, the storage 1130 may be a combination of fixed and/or removable storage devices, such as magnetic disk drives, flash drives, removable memory cards or optical storage, network attached storage (NAS), or a storage area-network (SAN). Further, computing system 1100 is included to be representative of a physical computing system as well as virtual machine instances hosted on a set of underlying physical computing systems. Further still, although shown as a single computing system, one of ordinary skill in the art will recognized that the components of the computing system 1100 shown in FIG. 11 may be distributed across multiple computing systems connected by a data communications network.

As shown, the memory 1120 includes an operating system 1121 and the renderer 102. As discussed herein, the renderer 102 may sample the visible portion of a tabulated directional distribution through a rectangular opening. To that end, the renderer 102 may rely on a rectification of the hemisphere of directions, that maps the rectangular opening to axis-aligned rectangular regions in the tabulation. This approach can then be used for various rendering applications for which sampling may be challenging using alternative approaches. One rendering application involves importance sampling the environment map visible at a shade point through a portal. Another rendering application involves importance sampling the directional emission distribution as seen on a quad light from a shade point. The techniques disclosed herein can result in considerable variance reduction compared to alternative approaches. The renderer 102 may ultimately output one or more rendered images or video frames 131.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects presented in this disclosure may be embodied as a system, method or computer program product. Accordingly, aspects disclosed herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects disclosed herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects disclosed herein may be written in any combination of one or more programming languages, including an object oriented programming language such as Java, Smalltalk, C++ or the like and conventional procedural programming languages, such as the "C" programming language or similar programming languages. The program code may execute entirely on the computer of a user, partly on the computer of the user, as a stand-alone software package, partly on the computer of the user and partly on a remote computer, or entirely on the remote computer or server. In the latter scenario, the remote computer may be connected to the computer of the user via any type of network, including a local area network (LAN) or a wide area network (WAN), or the connection may be made to an external computer (for example, through the Internet using an Internet Service Provider).

Aspects presented in this disclosure are described above with reference to flowchart illustrations or block diagrams of methods, apparatus (systems) and computer program products according to embodiments disclosed herein. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart or block diagram block or blocks.

Embodiments disclosed herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the embodiments presented herein, a user of the renderer 102 of FIG. 1 may submit an indoor scene model and an environment map for processing by the renderer 102 executing in the cloud and to generate and store rendered images or video in the cloud. Thus, the user may access the rendered images or video from any computing system attached to a network connected to the cloud (e.g., the Internet) and be charged based on the processing environment(s) used.

The flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams or flowchart illustration, and combinations of blocks in the block diagrams or flowchart illustration, can be implemented by special-purpose hardware-based systems that perform the specified functions or acts, or combinations of special purpose hardware and computer instructions.

While the foregoing is directed to embodiments presented in this disclosure, other and further embodiments may be devised without departing from the basic scope of contemplated embodiments, and the scope thereof is determined by the claims that follow.

What is claimed is:

1. A computer-implemented method of illuminating an indoor scene, the computer-implemented method comprising:
   receiving a directional distribution associated with the indoor scene, the indoor scene having a first scene element and a first quadrilateral, the first scene element having disposed thereon a first shading point;
   reparametrizing the directional distribution such that the first quadrilateral as viewed from the first shading point corresponds to an axis-aligned rectangular region in the reparametrized directional distribution;
   drawing one or more samples from the shading point by performing importance sampling based on the reparametrized directional distribution using a single, summed-area table; and
   illuminating the first scene element using the one or more samples and by operation of one or more computer processors, whereafter the first scene element is output.

2. The computer-implemented method of claim 1, wherein the first quadrilateral comprises a first light source, wherein the directional distribution comprises an emission profile of the first light source.

3. The computer-implemented method of claim 2, wherein the one or more samples are drawn from the shading point by importance sampling the reparametrized emission profile.

4. The computer-implemented method of claim 1, wherein the directional distribution is at least part of an environment map depicting a surrounding environment external to the indoor scene, wherein the first quadrilateral comprises a first portal through which a first region of the surrounding environment is visible to the first shading point.

5. The computer-implemented method of claim 4, wherein the first portal comprises a rectangular approximation of a first opening from the indoor scene to the surrounding environment.

6. The computer-implemented method of claim 5, further comprising:
   defining the first portal; and
   determining a function of both the reparametrized environment map and a visibility map specifying visibility of the surrounding environment as viewed from the first shading point through the first portal.

7. The computer-implemented method of claim 6, wherein the one or more samples are drawn from the shading point through the first portal by importance sampling the function of the reparametrized environment map and the visibility map.

8. A non-transitory computer-readable medium containing a program which, when executed, performs an operation to illuminate an indoor scene, the operation comprising:

receiving a directional distribution associated with the indoor scene, the indoor scene having a first scene element and a first quadrilateral, the first scene element having disposed thereon a first shading point;

reparametrizing the directional distribution such that the first quadrilateral as viewed from the first shading point corresponds to an axis-aligned rectangular region in the reparametrized directional distribution;

drawing one or more samples from the shading point by performing importance sampling based on the reparametrized directional distribution using a single, summed-area table; and illuminating the first scene element using the one or more samples and by operation of one or more computer processors when executing the program, whereafter the first scene element is output.

9. The non-transitory computer-readable medium of claim 8, wherein the first quadrilateral comprises a first light source, wherein the directional distribution comprises an emission profile of the first light source.

10. The non-transitory computer-readable medium of claim 9, wherein the one or more samples are drawn from the shading point by importance sampling the reparametrized emission profile.

11. The non-transitory computer-readable medium of claim 8, wherein the directional distribution is at least part of an environment map depicting a surrounding environment external to the indoor scene, wherein the first quadrilateral comprises a first portal through which a first region of the surrounding environment is visible to the first shading point.

12. The non-transitory computer-readable medium of claim 11, the first portal comprising a rectangular approximation of a first opening from the indoor scene to the surrounding environment.

13. The non-transitory computer-readable medium of claim 12, wherein the operation further comprises:

defining the first portal; and determining a function of both the reparametrized environment map and a visibility map specifying visibility of the surrounding environment as viewed from the first shading point through the first portal.

14. The non-transitory computer-readable medium of claim 13, wherein the one or more samples are drawn from the shading point through the first portal by importance sampling the function of the reparametrized environment map and the visibility map.

15. A computer-implemented method of illuminating an indoor scene using image-based lighting, the computer-implemented method comprising:

receiving an environment map depicting a surrounding environment external to the indoor scene, the indoor scene having a first scene element and a first opening to the surrounding environment, the first scene element having disposed thereon a first shading point;

defining a first portal through which a first region of the surrounding environment is visible to the first shading point, the first portal comprising a rectangular approximation of the first opening;

reparametrizing the environment map such that the first region of the surrounding environment as viewed from the first shading point through the first portal corresponds to an axis-aligned rectangular region in the reparametrized environment map;

determining a function of both the reparametrized environment map and a visibility map specifying visibility of the surrounding environment as viewed from the first shading point through the first portal;

drawing one or more samples from the shading point through the first portal by importance sampling the function of the reparametrized environment map and the visibility map using a single, summed-area table per portal; and illuminating the first scene element using the one or more samples and by operation of one or more computer processors, whereafter the first scene element is output.

16. The computer-implemented method of claim 15, wherein the first opening is non-rectangular, wherein the first portal is generated in order to improve sampling efficiency relative to the first opening.

17. The computer-implemented method of claim 15, wherein the environment map subsequent to reparametrization is parametrized using rectified coordinates comprising $\alpha$ and $\beta$ angles subtended with x and y axes, wherein the environment map prior to reparametrization is parametrized using spherical coordinates or Cartesian coordinates.

18. The computer-implemented method of claim 15, wherein the indoor scene has a plurality of shading points and a plurality of openings to the surrounding environment, wherein a plurality of portals are generated, wherein the environment map is reparametrized such that any region of the surrounding environment as viewed from the any shading point through any portal corresponds to an axis-aligned rectangular region in the environment map, wherein the opening is, in respective instances, a window opening and a doorway, wherein the function comprises a product, wherein each portal is associated with a respective importance map.

19. The computer-implemented method of claim 18, wherein the plurality of portals include the first portal and a second portal, wherein the computer-implemented method further comprises:

determining an expected contribution of the reparametrized environment map visible through the first portal; and determining to importance sample the first portal based on the expected contribution, wherein at least the second portal is not importance sampled;

wherein the first portal is associated with a first importance map, wherein the first importance map comprises a scalar importance table;

wherein the scalar importance table is transformed into the summed-area table in order to facilitate importance sampling discrete 2D distributions in a manner such that values in one or more visible regions of the scalar importance table are treated as an unnormalized, piecewise-constant probability density function.

20. The computer-implemented method of claim 19, wherein the summed-area table permits sampling according to a desired product distribution at an arbitrary shading location in order to limit introduction of sampling variance, wherein the summed-area table permits evaluating integrals over rectangular windows in constant time, wherein the summed-area table is linearly interpolated in order to permit computing integrals of fractional rectangles, wherein each single, summed-area table is precomputed;

wherein the first opening is non-rectangular, wherein the first portal is generated in order to improve sampling efficiency relative to the first opening;

wherein the environment map subsequent to reparametrization is parametrized using rectified coordinates comprising $\alpha$ and $\beta$ angles subtended with x and y axes, wherein the environment map prior to reparametrization is parametrized using spherical coordinates or Cartesian coordinates.

* * * * *

UNITED STATES PATENT AND TRADEMARK OFFICE
CERTIFICATE OF CORRECTION

PATENT NO. : 9,852,541 B2
APPLICATION NO. : 14/749447
DATED : December 26, 2017
INVENTOR(S) : Benedikt Bitterli et al.

It is certified that error appears in the above-identified patent and that said Letters Patent is hereby corrected as shown below:

On the Title Page

In item (56), in Column 2, under "Other Publications", Line 10, delete ""Stratied" and insert -- "Stratified --, therefor.

In item (56), in Column 2, under "Other Publications", Line 12, delete "tor" and insert -- for --, therefor.

In item (56), in Column 2, under "Other Publications", Line 13, delete "Ilurnination,"" and insert -- Illumination," --, therefor.

In the Drawings

On Sheet 8 of 10 in Figure 9, reference numeral 920, Line 1, delete "RAPARAMETRIZE" and insert -- REPARAMETRIZE --, therefor.

On Sheet 9 of 10 in Figure 10, reference numeral 1004, Line 1, delete "PARAMETRIZATION" and insert -- PARAMETERIZATION --, therefor.

In the Specification

In Column 2, Line 56, after "disclosure" insert -- . --.

In Column 4, Line 61, delete "$\alpha L_{env}$" and insert -- $aL_{evn}$ --, therefor.

In Column 9, Lines 5-6, delete "illuminating" and insert -- Illuminating --, therefor.

Signed and Sealed this
Twenty-sixth Day of June, 2018

Andrei Iancu
*Director of the United States Patent and Trademark Office*